United States Patent
Takei (10) Patent No.: US 7,834,833 B2
(45) Date of Patent: Nov. 16, 2010

(54) LIQUID CRYSTAL DISPLAY DEVICE SELECTABLE BETWEEN WIDE VIEW ANGLE DISPLAY AND NARROW VIEW ANGLE DISPLAY AND LIQUID CRYSTAL DISPLAY APPARATUS USING SAME

(75) Inventor: Jiro Takei, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 1114 days.

(21) Appl. No.: 11/511,987

(22) Filed: Aug. 29, 2006

(65) Prior Publication Data

US 2007/0046881 A1 Mar. 1, 2007

(30) Foreign Application Priority Data

Aug. 29, 2005 (JP) ............................. 2005-247726

(51) Int. Cl.
*G09G 3/36* (2006.01)
(52) U.S. Cl. ............................ 345/87; 345/55; 345/204
(58) Field of Classification Search ................... 345/87, 345/55, 204
See application file for complete search history.

(56) References Cited

U.S. PATENT DOCUMENTS

2005/0253797 A1* 11/2005 Kamada et al. ................ 345/89
2006/0146250 A1* 7/2006 Wu et al. ..................... 349/141

FOREIGN PATENT DOCUMENTS

JP 2004-133334 A 4/2004

* cited by examiner

*Primary Examiner*—Richard Hjerpe
*Assistant Examiner*—Leonid Shapiro
(74) *Attorney, Agent, or Firm*—Holtz, Holtz, Goodman & Chick, PC

(57) ABSTRACT

A liquid crystal display device has a plurality of pixel electrodes arranged in a matrix, a plurality of TFTs connected to the pixel electrodes respectively, and a plurality of gate lines and data lines, on the inner surface of one substrate of a pair of substrates facing each other via a liquid crystal layer. A first opposing electrode for forming, between itself and the plurality of pixel electrodes, a vertical electric field parallel with the direction of a normal line of the substrates, and a second opposing electrode for forming, between itself and the plurality of pixel electrodes, an oblique electric field obliquely inclined from the direction of the normal line are formed on the inner surface of the other substrate.

20 Claims, 5 Drawing Sheets

LIQUID CRYSTAL DISPLAY DEVICE SELECTABLE BETWEEN WIDE VIEW ANGLE DISPLAY AND NARROW VIEW ANGLE DISPLAY AND LIQUID CRYSTAL DISPLAY APPARATUS USING SAME

BACKGROUND OF THE INVENTION

1. Field of the Invention

The present invention relates to a changeable view angle type liquid crystal device which can select between wide view angle display and narrow view angle display, and a liquid crystal display apparatus using the same.

2. Description of the Related Art

Since a liquid crystal display device has a wide view angle, its display might be seen by someone other than the viewer, from a direction inclined from the front forward direction.

Hence, there has been proposed a liquid crystal display apparatus which limits the view angle of the liquid crystal display device by using a view angle limiting device, which is disposed on one surface of the liquid crystal display device, and whose area corresponding to the screen of the liquid crystal display device is divided into a plurality of regions to make the liquid crystal molecules in the respective regions aligned in different alignment states region by region (Unexamined Japanese Patent Application KOKAI Publication No. 2004-133334).

The view angle limiting device is structured such that its area corresponding to the screen of the liquid crystal display device is divided into a plurality of regions, so that in each region, the liquid crystal molecules of a liquid crystal layer, which is sealed between a pair of substrates, are aligned in an alignment state having a view angle in a direction inclined to one side from a normal line of the liquid crystal display device, and in an alignment state having a view angle in a direction inclined from the normal line to a reverse side to that side. The pair of substrates of the view angle limiting device have electrodes having a predetermined shape on their inner surfaces facing each other.

Such a liquid crystal display apparatus limits the view angle of an image displayed by the liquid crystal display device, by applying a voltage between the electrodes of the view angle limiting device to reduce the visibility from an oblique observing direction.

Specifically, when no voltage is applied between the electrodes of the view angle limiting device, i.e., when the view angle limiting device is in a non-display status, the display image of the liquid crystal display device can be seen at a wide view angle. Contrarily, when a voltage is applied between the electrodes of the view angle limiting device, the display image of the liquid crystal display device is hidden by display made by the respective regions of the view angle limiting device, that have a view angle in the direction inclined to one side, and display made by the respective regions that have a view angle in the direction inclined to the reverse side, if the display image of the liquid crystal display device is observed from a direction inclined to one side from the front forward direction, and from a direction inclined to the reverse side to that side. Therefore, the display image of the liquid crystal display device cannot be recognized from the direction inclined to one side and from the direction inclined to the reverse side, and the view angle of the display image is seemingly limited and becomes narrow.

However, the view angle limiting device is hard to manufacture, because a complex aligning process (rubbing on aligning films) for imparting different directivities to each region has to be applied to the inner surfaces of the pair of substrates, in order to align the liquid crystal molecules of the liquid crystal layer in different alignment states region by region.

Further, a changeable view angle type liquid crystal display apparatus having the above-described view angle limiting device has to use two liquid crystal devices, thus has a problem that the apparatus becomes thick and its structure becomes complicated.

SUMMARY OF THE INVENTION

An object of the present invention is to provide a changeable view angle type liquid crystal display apparatus which has a simple structure and can perform wide view angle display and a narrow view angle display.

To achieve the above object, a liquid crystal display device according to a first aspect of the present invention comprises:

a pair of substrates facing each other via a liquid crystal layer;

a plurality of pixel electrodes arranged in a matrix on an inner surface of one substrate, of facing inner surfaces of the pair of substrates;

a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected;

a first opposing electrode provided on the inner surface of the other substrate, for generating, between itself and the plurality of pixel electrodes respectively, a vertical electric field in a direction substantially parallel with a direction of a normal line of the substrates; and a second opposing electrode provided on the inner surface of the other substrate, for generating, between itself and the plurality of pixel electrodes respectively, an oblique electric field in a direction inclined obliquely from the direction of the normal line of the substrates.

Since the liquid crystal display device according to the first aspect comprises pixel electrodes on one of facing inner surfaces of a pair of substrates facing each other, and comprises a first opposing electrode for generating, between the itself and the pixel electrode, a vertical electric field substantially parallel with the normal line of the substrates, and a second opposing electrode for generating an oblique electric field in a direction inclined from the normal line of the substrates, on the inner surface of the other substrates, the device can perform wide view angle display and narrow view angle display with a simple structure.

In the liquid crystal display device according to the first aspect, it is preferred that the first opposing electrode be arranged so as to oppose to the plurality of pixel electrodes respectively; and the second opposing electrode be arranged so as to oppose to regions between adjoining pixel electrodes respectively. Further, it is preferred that the first opposing electrode be formed so as to oppose to a plurality of pixel electrode columns respectively, which each include pixel electrodes arranged in a column direction, of the plurality of pixel electrodes arranged in a matrix of a row direction and the column direction; and the second opposing electrode be formed so as to oppose to regions between the plurality of pixel electrode columns respectively. In this case, the first opposing electrode be formed into a pectinate shape comprising a plurality of stripe-shaped electrode portions opposing to the plurality of pixel electrode columns respectively over an entire length of the columns, and a wiring portion which binds one end of the respective electrode portions at an outside of one end of the pixel electrode columns; and the second opposing electrode be formed into a pectinate shape comprising a plurality of stripe-shaped electrode portions opposing to the regions between the plurality of pixel electrode columns respectively over an entire length of the regions, and a wiring portion which binds one end of the respective electrode portions at an outside of the other end of the pixel electrode columns. Further, it is preferred that the first opposing electrode be formed to have a width smaller than a width of the pixel electrodes opposing thereto respectively; and the second opposing electrode be formed to have a width substantially same as an interval between the plurality of pixel electrode columns.

It is preferred that the present liquid crystal display device further comprises stripe-shaped color filters having three colors of red, green, and blue, which are formed on the inner surface of the other substrate of the pair of substrates, such that the color filters respectively correspond to a plurality of pixel electrode columns each including pixel electrodes arranged in a column direction, of the plurality of pixel electrodes arranged in a matrix of a row direction and the column direction, and such that the color filters have a width defined by one side edge of each filter that opposes to a center line of one of two regions between the pixel electrode columns which adjoin each other via one pixel electrode column, and by the other side edge of each filter that opposes to a center line of the other of the two regions between the pixel electrode columns. These color filters may be stripe-shaped color filters having three colors of red, green, and blue, which are formed on the inner surface of the other substrate of the pair of substrates, such that the color filters respectively correspond to a plurality of pixel electrode rows each including pixel electrodes arranged in a row direction, of the plurality of pixel electrodes arranged in a matrix of the row direction and a column direction, and such that the color filters have a length extending over an entire length of the pixel electrode rows. Alternatively, these color filters may be dot-shaped color filters having three colors of red, green, and blue, which are formed on the inner surface of the other substrate of the pair of substrates, such that the color filters respectively correspond to the pixel electrodes included in a plurality of pixel electrode columns each including pixel electrodes arranged in a column direction, of the plurality of pixel electrodes arranged in a matrix of a row direction and the column direction, and such that the color filters have a width defined by one side edge of each filter that opposes to a center line of one of two regions between the pixel electrode columns which adjoin each other via one pixel electrode column, and by the other side edge of each filter that opposes to a center line of the other of the two regions between the pixel electrode columns.

The liquid crystal display device may further comprise a pair of polarizing plates, which are disposed at external sides of the pair of substrates respectively, and whose transmission axes are arranged so as to constitute a liquid crystal display device of a normally white mode which allows light transmission when no electric field is applied between the plurality of pixel electrodes and the first opposing electrode. Alternatively, the liquid crystal display device may further comprise a pair of polarizing plates, which are disposed at external sides of the pair of substrate respectively, and whose transmission axes are arranged so as to constitute a liquid crystal display device of a normally black mode which substantially blocks light when no electric field is applied between the plurality of pixel electrodes and the first opposing electrode.

The liquid crystal display apparatus according to a second aspect of the present invention comprises:

a liquid crystal display device comprising
a pair of substrates facing each other via a liquid crystal layer,
a plurality of pixel electrodes arranged in a matrix on an inner surface of one substrate, of facing inner surfaces of the pair of substrates,
a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected,
a first opposing electrode provided on the inner surface of the other substrate, for generating, between itself and the plurality of pixel electrodes respectively, a vertical electric field in a direction substantially parallel with a direction of a normal line of the substrates, and
a second opposing electrode provided on the inner surface of the other substrate, for generating, between itself and the plurality of pixel electrodes respectively, an oblique electric field in a direction inclined obliquely from the direction of the normal line of the substrate; and
a display driver which applies a vertical electric field corresponding to the image data to the liquid crystal layer in pixel regions defined by regions in which the plurality of pixel electrodes and the first opposing electrode of the liquid crystal display device oppose to each other, and applies an oblique electric field between the plurality of pixel electrodes and the second opposing electrode, for aligning liquid crystal molecules of the liquid crystal layer in regions adjoining the pixel regions at a predetermined tilt.

Since the liquid crystal display apparatus according to the second aspect comprises pixel electrodes on one of facing inner surfaces of a pair of substrates, and comprises, on the inner surface of the other substrate, a first opposing electrode for generating, between itself and the pixel electrodes, a vertical electric field in a direction substantially parallel with the normal line of the substrates, a second opposing electrode for generating an oblique electric field in a direction inclined from the normal line of the substrates, and a display driver which applies the vertical electric field corresponding to image data to the liquid crystal layer in the pixel regions, and applies, to the regions adjoining the pixel regions, an oblique electric field for aligning liquid crystal molecules of the liquid crystal layer at a predetermined tilt, the apparatus can perform wide view angle display and narrow vie angle display with a simple structure.

In the liquid crystal display apparatus according to the second aspect, it is preferred that the first opposing electrode be formed such that the first opposing electrode opposes to a plurality of pixel electrode groups respectively, each of which includes pixel electrodes arranged in one of row and column directions, of the plurality of pixel electrodes arranged in a matrix of the row and column directions, and such that the first opposing electrode has a width smaller than a width of the pixel electrodes opposing thereto respectively; and the second opposing electrode be formed so as to oppose to regions between the plurality of pixel electrode groups arranged in the one direction respectively.

It is preferred that the display driver apply a data voltage corresponding to image data to the plurality of pixel electrodes respectively, apply a first opposing voltage having a predetermined value for generating, between the first opposing electrode and the pixel electrodes, an electric field corresponding to the data voltage to the first opposing electrode, and selectively apply a second opposing voltage having a polarity same as that of the first opposing voltage and an absolute value larger than that of the first opposing voltage to the second opposing electrode.

It is preferred that the display driver apply a data voltage corresponding to image data to the plurality of pixel electrodes respectively, apply a first opposing voltage having a predetermined value for generating, between the first opposing electrode and the pixel electrodes, an electric field corresponding to the data voltage to the first opposing electrode, and selectively apply, to the second opposing electrode, one of the first opposing voltage and a second opposing voltage which has a polarity same as that of the first opposing voltage and an absolute value larger than that of the first opposing voltage and which is for substantially blocking light transmission through the regions adjoining the pixel regions.

A liquid crystal display apparatus according to a third aspect of the present invention comprises:

a liquid crystal display device comprising a pair of substrates facing each other via a liquid crystal layer, a plurality of pixel electrodes arranged in a matrix on an inner surface of one substrate, of facing inner surfaces of the pair of substrates, a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected, a first opposing electrode provided on the inner surface of the other substrate, for generating, between itself and the plurality of pixel electrodes respectively, a vertical electric field in a direction substantially parallel with a direction of a normal line of the substrates, and a second opposing electrode provided on the inner surface of the other substrate, for generating, between itself and the plurality of pixel electrodes respectively, an oblique electric field in a direction inclined obliquely from the direction of the normal line of the substrate; and a display driver which applies a data voltage for generating an electric field corresponding to the data signal between the plurality of pixel electrodes and the first opposing electrode, and selectively applies, between the pixel electrodes and the second opposing electrode, a view angle control voltage for generating an electric field for aligning liquid crystal molecules of the liquid crystal layer in an alignment state which makes a display as seen from an oblique direction seem substantially black or white.

Since the liquid crystal display apparatus according to the third aspect comprises pixel electrodes on one of facing inner surfaces of a pair of substrate, and comprises, on the inner surface of the other substrate, a first opposing electrode for generating, between itself and the pixel electrode, a vertical electric field in a direction substantially parallel with the normal line of the substrate, a second opposing electrode for generating an oblique electric field in a direction inclined from the normal line of the substrate, and a display driver which applies a data voltage for generating an electric field corresponding to a data signal between the plurality of pixel electrodes and the first opposing electrode, and selectively applies, between the pixel electrodes and the second opposing electrode, a view angle control voltage for generating an electric field for aligning the liquid crystal molecules of the liquid crystal layer in an alignment state which makes the display as seen from an oblique direction seem substantially black or white, the apparatus can perform wide view angle display and narrow view angle display with a simple structure.

In the liquid crystal display apparatus according to the third aspect, it is preferred that the display driver apply a data voltage corresponding to image data to the plurality of pixel electrodes respectively, apply a first opposing voltage having a predetermined value for generating, between the first opposing electrode and the pixel electrodes, an electric field corresponding to the data voltage to the first opposing electrode, and apply a second opposing voltage whose polarity with respect to the data voltage is same as that of the first opposing voltage and whose absolute value is sufficiently larger than that of the first opposing voltage to the second opposing electrode.

Further, it is preferred that the display driver apply a data voltage corresponding to image data to the plurality of pixel electrodes respectively, apply a first opposing voltage having a predetermined value for generating, between the first opposing electrode and the pixel electrodes, an electric field corresponding to the data voltage to the first opposing electrode, and apply a second opposing voltage which is the same voltage as the data voltage to the second opposing electrode.

Further, it is preferred that the display driver apply a data voltage corresponding to image data to the plurality of pixel electrodes respectively, apply a first opposing voltage having a predetermined value for generating, between the first opposing electrode and the pixel electrodes, an electric field corresponding to the data voltage to the first opposing electrode, and selectively apply the first opposing voltage and a second opposing voltage having a polarity same as that of the first opposing voltage and an absolute value larger than that of the first opposing voltage to the second opposing electrode.

Further, it is preferred that the display driver may be able to select from application of the data voltage between the plurality of pixel electrodes, and the first opposing electrode and the second opposing electrode in response to designation to wide view angle display, and application of the data voltage corresponding to image data between the plurality of pixel electrodes and the first opposing electrode and application of a view angle control voltage between the plurality of pixel electrodes and the second opposing electrode in response to designation to narrow view angle display.

It is preferred that the view angle control voltage be a voltage which has a polarity same as that of the data voltage and an absolute value sufficiently larger than that of the data voltage.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Liquid crystal display devices will be described below as embodiments of the present invention with reference to the accompanying drawings.

Figure 1:
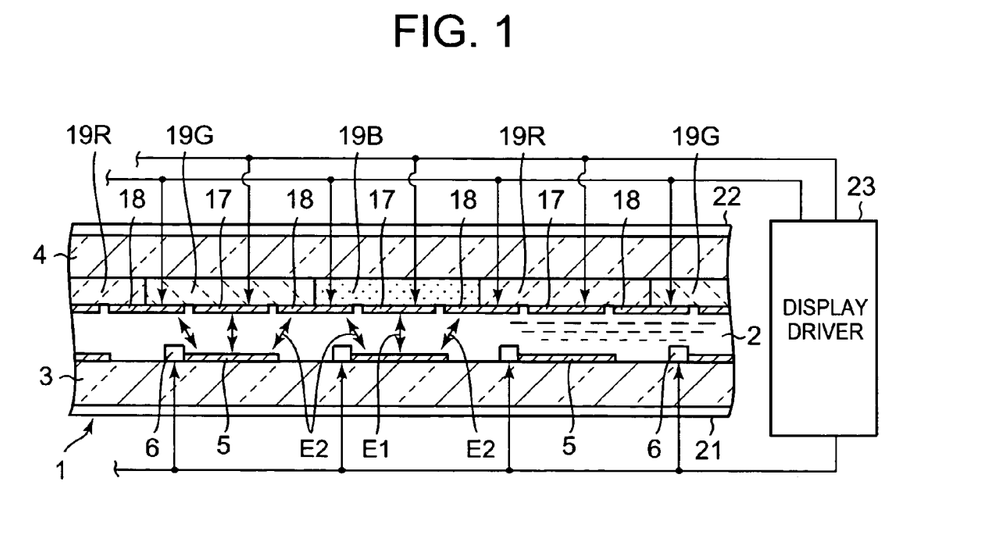
FIG. 1 is a cross sectional view showing a structure of a liquid crystal display apparatus and a schematic structure of a display driver as a first embodiment of the present invention.

FIG. 1 to FIG. 6 show the first embodiment of the present invention, and FIG. 1 is a cross sectional view showing the structure of a liquid crystal display apparatus and a schematic structure of a display driver.

The liquid crystal display apparatus is a changeable view angle type, and comprises a liquid crystal display device 1 which solely can perform both wide view angle display and narrow view angle display, and a display driver 23.

The liquid crystal display device 1 is an active matrix liquid crystal display device comprising an active element constituted by a thin film transistor (hereinafter referred to as TFT).

In the liquid crystal display device 1, one substrate 3 of a pair of transparent substrates 3 and 4 facing each other via a liquid crystal layer 2, has on its inner surface, a plurality of transparent pixel electrodes 5 arranged in a matrix of a row direction (left and right direction of the screen) and a column direction (up and down direction of the screen), a plurality of TFTs 6 connected to the pixel electrodes 5 respectively, and a plurality of gate lines 13 and data lines 14 (see FIG. 4) connected to the plurality of TFTs 6 respectively. The other substrate 4 has on its inner surface, a first transparent opposing electrode 17 for generating a vertical electric field El having a direction substantially parallel with the direction of the normal line of the substrates 3 and 4 between itself and the plurality of pixel electrodes 5, and a second transparent opposing electrode 18 for generating an oblique electric field E2 inclined from the direction of the normal line of the substrates 3 and 4 between itself and the plurality of pixel electrodes 5. In FIG. 1, the TFTs 6 are shown in a simplified state, and the gate lines 13 and data lines 14 are omitted.

Hereinafter, one substrate 3 on which the plurality of pixel electrodes 5, TFTs 6, gate lines 13, and data lines 14 are formed will be referred as TFT substrate, and the other substrate 4 on which the first and second opposing electrodes 17 and 18 are formed will be referred to as opposing substrate.

Figure 3:
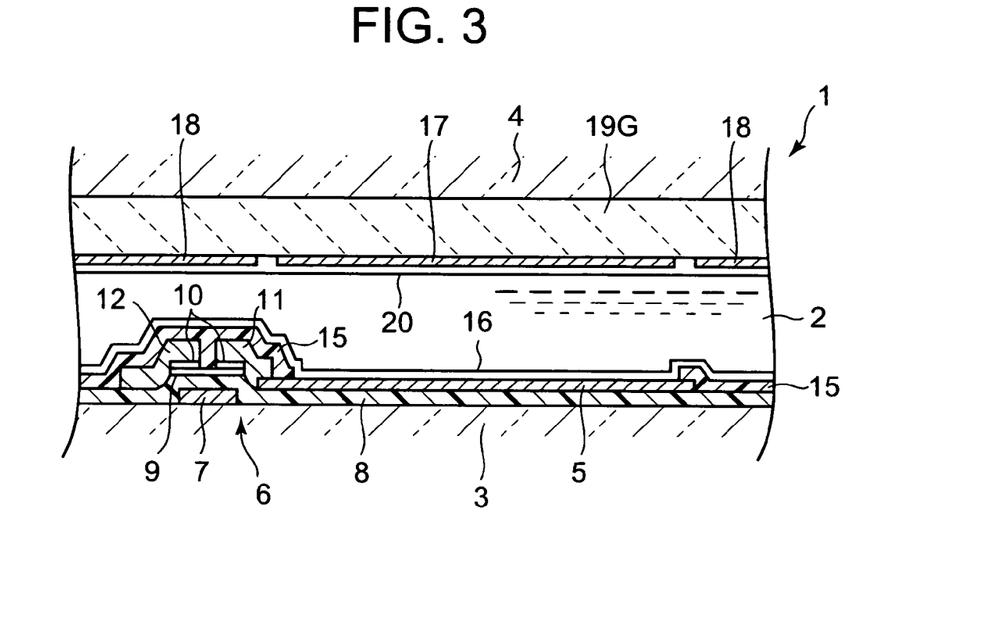
FIG. 3 is a cross sectional diagram showing one pixel portion of the liquid crystal display device according to the first embodiment in enlargement.
Figure 4:
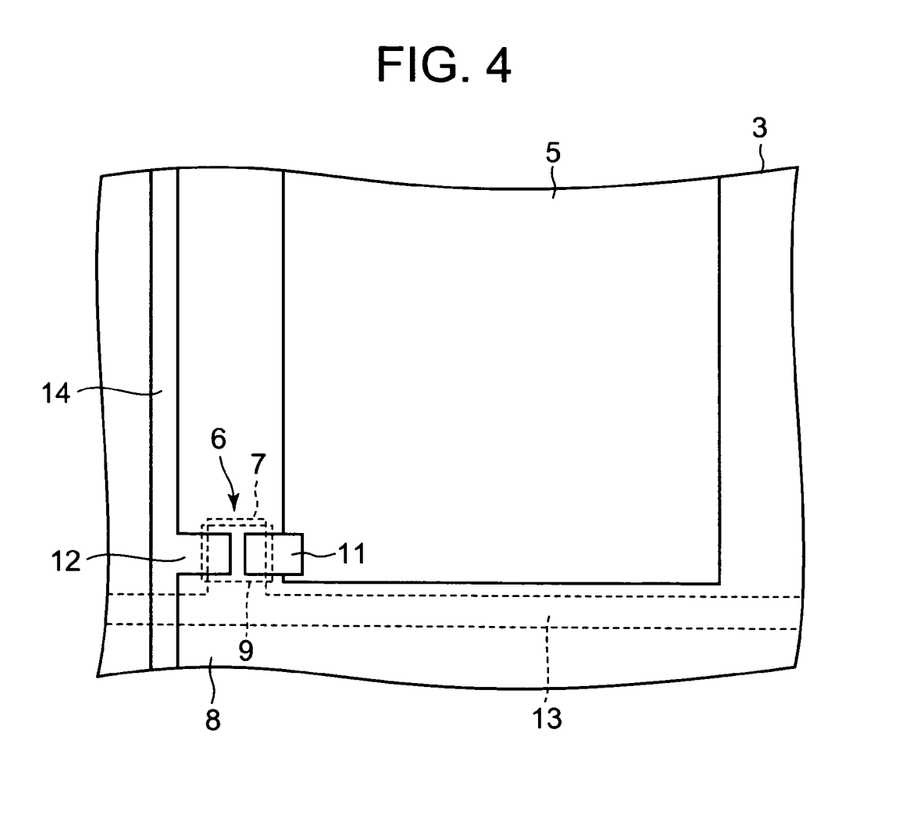
FIG. 4 is a plan view showing a part corresponding to one pixel portion on one substrate of the liquid crystal display device in enlargement.

FIG. 3 is a cross sectional view showing one pixel portion of the liquid crystal display device 1 in enlargement, and FIG. 4 is a plan view showing a portion corresponding to one pixel portion of one substrate of the liquid crystal display device 1 in enlargement. As shown in FIG. 3 and FIG. 4, the TFT 6 comprises a gate electrode 7 formed on the substrate surface of the TFT substrate 3, a transparent gate insulating film 8 formed substantially entirely on the TFT substrate 3 to cover the gate electrode 7, an i type semiconductor film 9 formed on the gate insulating film 8 so as to oppose to the gate electrode 7, and a source electrode 11 and drain electrode 12 which are formed on both sides of the i type semiconductor film 9 between which a channel region of the film 9 is sandwiched.

On the substrate surface of the TFT substrate 3, the plurality of pixel electrodes 5 form pixel electrode rows by respective pixel electrode groups each including a plurality of pixels arranged in the row direction, and form pixel electrode columns by respective pixel electrode groups each including a plurality of pixels arranged in the column direction. The gate lines 13 are formed on the substrate surface of the TFT substrate 3 in a direction parallel with the row direction between the plurality of pixel electrode rows. The data lines 14 are formed on the gate insulating film 8 in a direction parallel with the column direction between the plurality of pixel electrode columns. The gate electrode 7 of the TFT 6 is connected to the gate line 13 corresponding to that TFT 6, and the drain electrode 12 of the TFT 6 is connected to the data line 14 corresponding to that TFT 6.

The plurality of pixel electrodes 5 are formed on the gate insulating film 8, and have the source electrode 11 of the corresponding TFTs 6 connected thereto respectively. Each of the plurality of pixel electrodes 5 is disposed so as to oppose to a portion of the first transparent opposing electrode 17, and the width of each pixel electrode 5 is larger than the width of the corresponding portion of the first transparent opposing electrode 17 so that both edges of each pixel electrode 5 oppose to the portions of the second transparent opposing electrode 18 adjoining that corresponding portion of the first transparent opposing electrode 17.

An overcoat insulating film 15 is further formed on the inner surface of the TFT substrate 3 so as to cover the plurality of TFTs 6 and data lines 14, and an aligning film 16 is formed on the overcoat insulating film 15 so as to cover the plurality of pixel electrodes 5.

On the other hand, on the opposing substrate 4 having first and second opposing electrodes 17 and 18 on its inner surface, the first opposing electrode 17 is formed so as to oppose to the plurality of pixel electrodes 5, and the second opposing electrode 18 is formed so as to oppose to the regions between adjoining pixel electrodes 5. According to the present embodiment, the second opposing electrode 18 is arranged so as to oppose to the regions between the pixel electrodes 5 which adjoin each other in the row direction.

Figure 5:
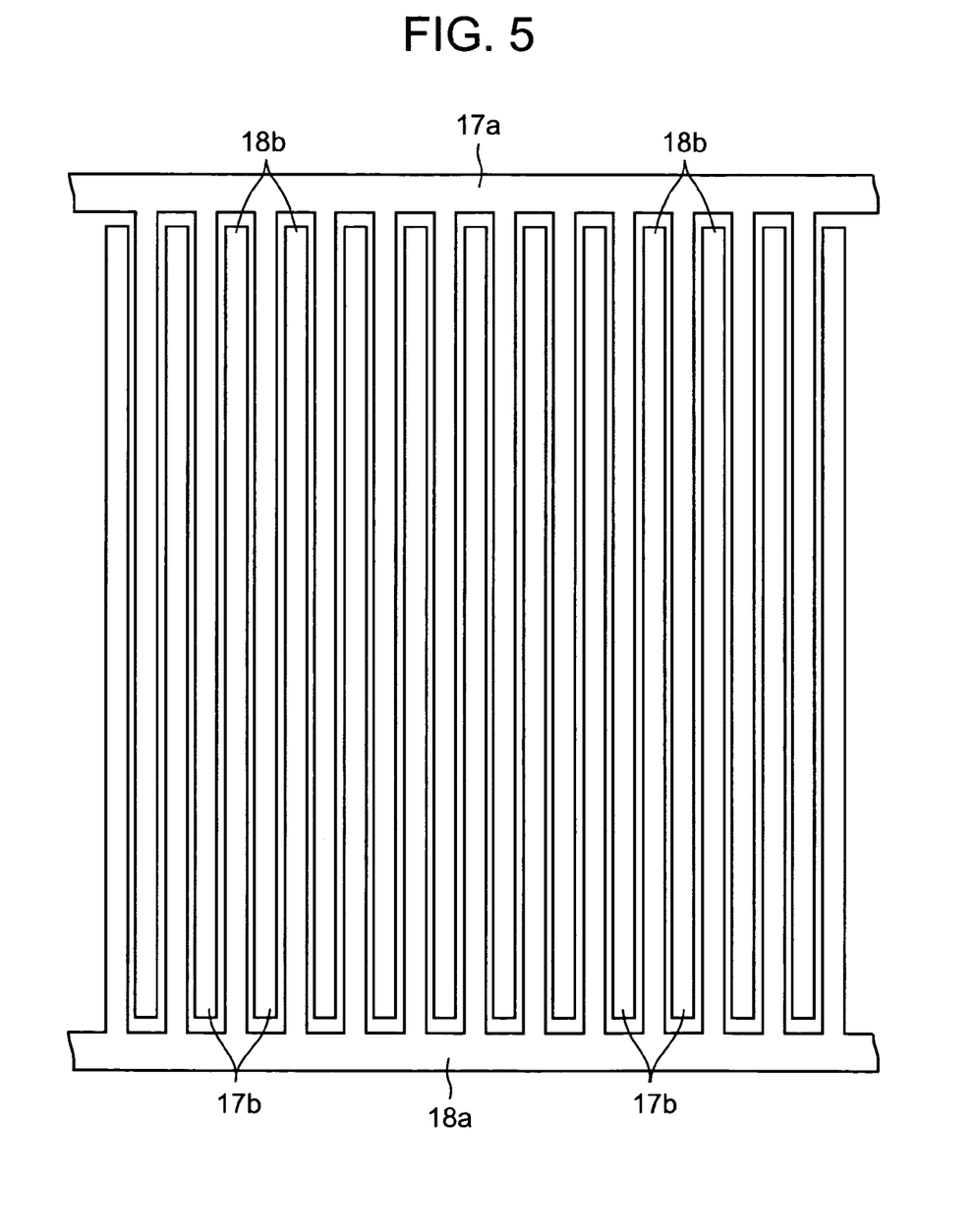
FIG. 5 is a plan view showing the first and second opposing electrodes of the liquid crystal display device.

FIG. 5 is a plan view of the first and second opposing electrodes 17 and 18. The first opposing electrode 17 is formed into a pectinate shape having a plurality of stripe-shaped electrode portions 17b opposing to the plurality of pixel electrode columns respectively, and a wiring portion 17a which binds one end of the respective electrode portions 17b at the outside of one end of the pixel electrode columns. The second opposing electrode 18 is formed into a pectinate shape having a plurality of stripe-shaped electrode portions 18b opposing to the regions between the plurality of pixel electrode columns respectively, and a wiring portion 18a which binds one end of the respective electrode portions 18b at the outside of the other end of the pixel electrode columns.

The stripe-shaped electrode portions 17b of the first opposing electrode 17 opposing to the plurality of pixel electrode columns respectively are formed to have a width slightly smaller than the width of the pixel electrodes 5. The stripe-shaped electrode portions 18b of the second opposing electrode 18 opposing to the regions between the plurality of pixel electrode columns respectively are formed to have a width substantially the same as the interval between the plurality of pixel electrode columns. According to the present embodiment, the stripe-shaped electrode portions 17b of the first opposing electrode 17 and the stripe-shaped electrode portions 18b of the second opposing electrode 18 are formed to have substantially the same width.

In the liquid crystal display device 1, pixels are defined by the regions in which the plurality of pixel electrodes 5 and the first opposing electrode 17 face each other. The vertical electric field E1 which is applied to the liquid crystal layer between the electrodes in the respective pixels controls the birefringence of the liquid crystal layer, thereby the light transmissivity in each pixel is controlled and an image is displayed by the plurality of such pixels. The oblique electric field E2 which is applied, between the pixel electrodes 5 and the second opposing electrode 18, to the regions between the pixels adjoining each other in the row direction, controls the birefringence of the regions between the pixels, thereby controls the view angle.

Figure 6:
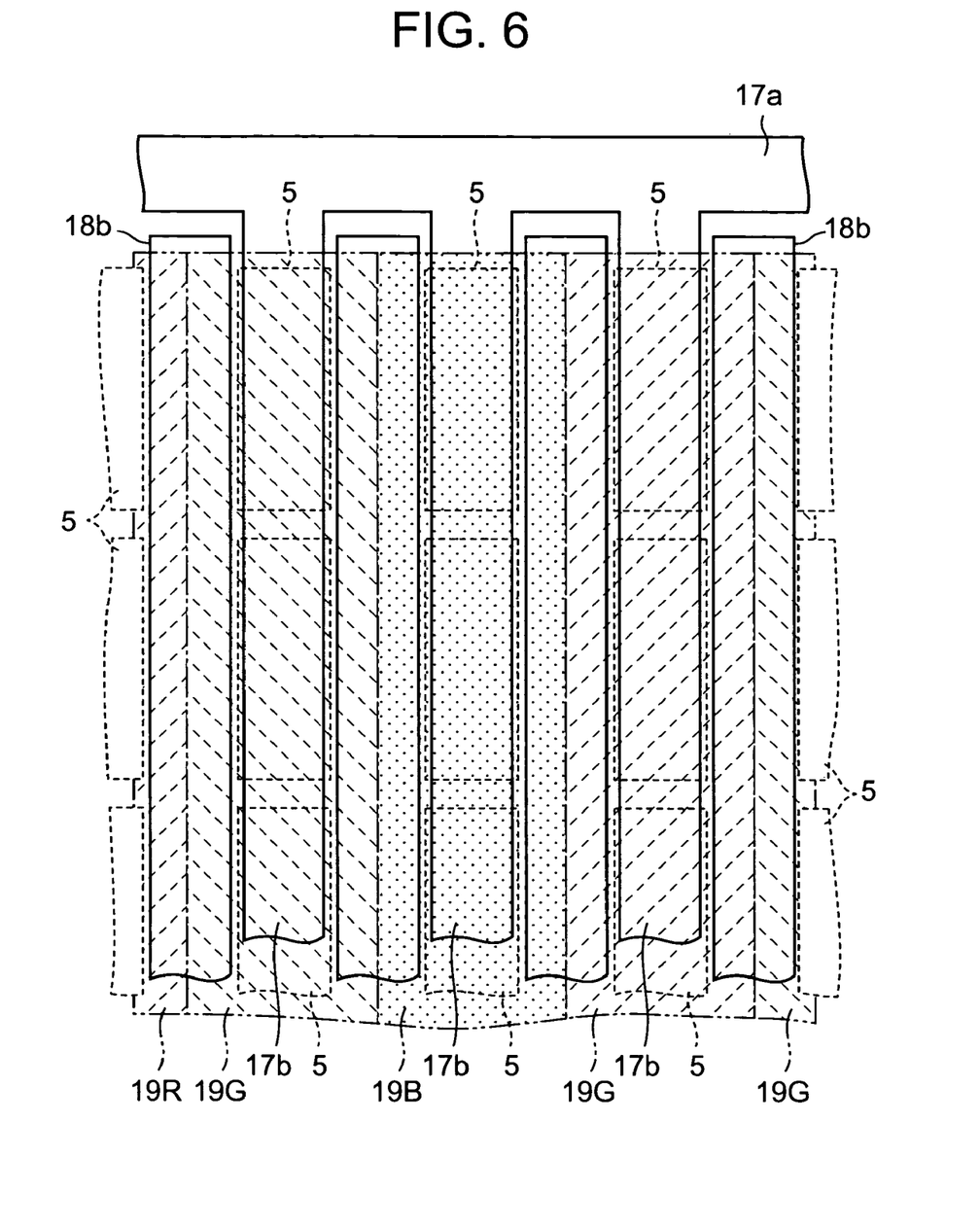
FIG. 6 is a plan view showing a relationship among the plurality of pixel electrodes, the first and second opposing electrodes, and color filters of the liquid crystal display device.

The liquid crystal display device 1 is a color image display device which comprises color filters 1 9R, 1 9G, and 1 9B of three colors of red, green, and blue each corresponding to one of the plurality of pixels. The color filters 19R, 19G, and 19B are formed on the inner surface of one substrate, for example, the opposing substrate 4, and the first and second opposing electrodes 17 and 18 are formed on the color filters 19R, 19G, and 19B.

FIG. 6 shows correspondence among the plurality of pixel electrodes 5, the first and second opposing electrodes 17 and 18, and the color filters 19R, 19G, and 19B. As shown in FIG. 6, according to the present embodiment, the stripe-shaped color filters 19R, 19G, and 19B of the three colors of red, green, and blue are formed on the inner surface of the opposing substrate 4 so as to correspond to the plurality of pixel electrode columns respectively. The respective stripe-shaped color filters 19R, 19G, and 19B are formed to have a width such that one side edge of each filter opposes to the center line of a region between pixel electrode columns, that adjoins another such region via one pixel electrode column (the center line substantially coincides with the center line of the stripe-shaped electrode portion 18b), and the other side edge of each filter opposes to the center line of that adjoining another region between pixel electrode columns (the center line substantially coincides with the center line of an adjoining stripe-shaped electrode portion 18b).

Further, an aligning film 20 is formed on the inner surface of the opposing substrate 4 so as to cover the first and second opposing electrodes 17 and 18.

The TFT substrate 3 and the opposing substrate 4 are joined to each other via a frame-like sealing member (unillustrated) at their circumferences. The liquid crystal layer 2 is formed of nematic liquid crystal having a positive dielectric anisotropy sealed in a region enclosed by the sealing member between the pair of substrates 3 and 4.

The TFT substrate 3 has a terminal arranging portion (unillustrated) which extends outside the opposing substrate 4, and the plurality of gate lines 13 and data lines 14 formed on the inner surface of the TFT substrate 3 are respectively connected to a plurality of gate line terminals and data line terminals formed on the terminal arranging portion.

Further, first and second opposing electrode terminals are formed on the terminal arranging portion of the TFT substrate 3, and the wiring portions 1 7a and 18b of the first and second opposing electrodes 17 and 18 formed on the inner surface of the opposing substrate 4 are connected to these opposing electrode terminals via unillustrated cross-connected portions formed at the sealed portions by the frame-like sealing member.

The liquid crystal display device 1 further comprises a pair of polarizing plates 21 and 22 which are disposed at the external side of the TFT substrate 3 and at the external side of the opposing substrate 4 respectively.

The liquid crystal display device 1 is a TN liquid crystal display device in which the liquid crystal molecules of the liquid crystal layer 2 are twisted, or a homogeneous liquid crystal display device in which the liquid crystal molecules are not twisted but aligned substantially parallel with the surface of the substrates 3 and 4. The pair of polarizing plates 21 and 22 have their transmission axes arranged for performing display of a normally white mode.

The display driver 23 sequentially supplies a gate signal to the plurality of gate lines 13 of the liquid crystal display device 1, and a data signal to the plurality of data lines 14 in synchronization with the supply of the gate signal, thereby applying a data voltage corresponding to image data carried on the data signal to each of the plurality of pixel electrodes 5 while applying a first opposing voltage to the first opposing electrode 17 for generating the vertical electric field E1 corresponding to the data voltage between the first opposing electrode 17 and the pixel electrodes 5, and a second opposing voltage selectively to the second opposing electrode 18 for generating the oblique electric field E2 between the second opposing electrode 18 and the pixel electrodes 5.

Figure 2:
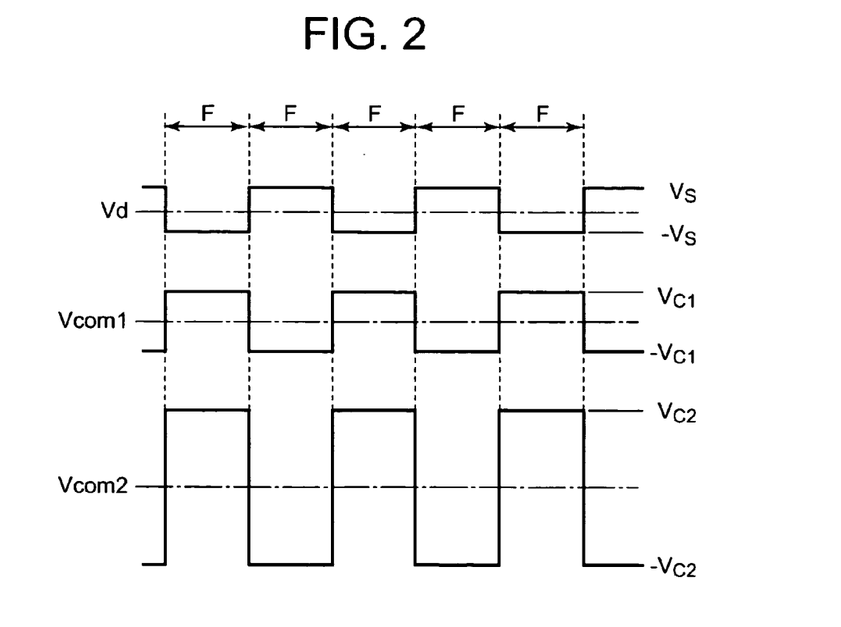
FIG. 2 is a waveform diagram showing waveforms of voltages applied by the display driver of the liquid crystal display apparatus according to the first embodiment, to pixel electrodes and first and second opposing electrodes of a liquid crystal display device.

FIG. 2 shows the waveforms of the data voltage $V_d$ and first and second opposing voltages $V_{com1}$ and $V_{com2}$ that are applied by the display driver 23 to the pixel electrodes 5 and first and second opposing electrodes 17 and 18 of the liquid crystal display device 1, where the shown data voltage $V_d$ is of a case that it makes all the pixels display a black image.

As shown in FIG. 2, the data voltage $V_d$ and first and second opposing voltages $V_{com1}$ and $V_{com2}$ are voltages which invert their polarity at each interval of a frame F. The data voltage $V_d$ changes its amplitude in the range of $\pm Vs$ in accordance with the data signal. The first opposing voltage $V_{com1}$ has a polarity reverse to that of the data voltage $V_d$ and changes it amplitude alternately between predetermined values $+V_{C1}$ and $-V_{C1}$. The second opposing voltage $V_{com2}$ has a polarity reverse to that of the data voltage $V_d$, i.e., the same polarity as the first opposing voltage $V_{com1}$, and changes its amplitude alternately between values $+V_{C2}$ and $-V_{C2}$ whose absolute values are sufficiently larger than that of the values of the first opposing voltage $V_{com1}$.

The present liquid crystal display apparatus is mounted at the display section of an electronic apparatus such as a portable phone, etc. The display driver 23 is designed to switch the voltages to apply, in accordance with selection between a wide view angle and a narrow view angle made by using a view angle selection key or the like provided on the electronic apparatus. For example, when a wide view angle is selected, the display driver 23 applies the first opposing voltage $V_{com1}$ to both the first and second opposing electrodes 17 and 18 of the liquid crystal display device 1. When a narrow view angle is selected, the display driver 23 switches the voltage to be applied to the second opposing electrode 18 of the first and second opposing electrodes 17 and 18 from the first opposing voltage $V_{com1}$ to the second opposing voltage $V_{com2}$.

As described above, the liquid crystal display device 1 comprises the plurality of pixel electrodes 5 arranged in a matrix, the plurality of TFTs 6 connected to the pixel electrodes 5 respectively, and the plurality of gate lines 13 and data lines 14 connected to the plurality of TFTs 6 respectively, on the inner surface of one substrate (TFT substrate) 3 of the facing inner surfaces of the pair of substrates 3 and 4 facing each other via the liquid crystal layer 2, and comprises the first opposing electrode 17 for generating the vertical electric field E1 parallel with the direction of the normal line of the substrates 3 and 4 between itself and the respective plurality of pixel electrodes 5 and the second opposing electrode 18 for generating the oblique electric field E2 inclined from the direction of the normal line of the substrates 3 and 4 between itself and the respective plurality of pixel electrodes 5 on the inner surface of the other substrate (opposing substrate) 4. Accordingly, the liquid crystal display device 1 displays an image by applying a data voltage corresponding to image data to the plurality of pixel electrodes 5 respectively, and applying, to the first opposing electrode 17, a first opposing voltage having a predetermined value for generating between the first opposing electrode 17 and the pixel electrodes 5, an electric field corresponding to the data voltage. Further, the liquid crystal display device 1 selectively applies, to the second opposing electrode 18, the first opposing voltage and the second opposing voltage which is for generating, between the second opposing electrode 18 and the pixel electrode 5, the oblique electric field E2, by which the liquid crystal molecules of the liquid crystal layer 2 are aligned in an alignment state which makes the display seem black when seen from the direction of the oblique electric field E2. Thereby, the liquid crystal display device 1 can selectively perform wide view angle display and narrow view angle display solely by itself.

That is, the liquid crystal display device 1 performs wide view angle display and narrow view angle display by constantly applying the first opposing voltage $V_{com1}$ to the first opposing electrode 17 of the first and second opposing electrodes 17 and 18, and selectively applying the first opposing voltage $V_{com1}$ and the second opposing voltage $V_{com2}$ to the second opposing electrode 18.

When the first opposing voltage $V_{com1}$ is applied to both the first and second opposing electrodes 17 and 18, the vertical electric field E1 and oblique electric field E2 both having an intensity corresponding to the data voltage $V_d$ are generated between the first and second opposing electrodes 17 and 18 and the pixel electrodes 5. Accordingly, the liquid crystal molecules of the liquid crystal layer 2 that exist in the regions in which the pixel electrodes 5 face the first and second opposing electrodes 17 and 18 (i.e., the regions that include the regions defining the pixels plus the regions in which the pixel electrodes 5 face the second opposing electrode 18) behave in accordance with the electric fields E1 and E2 and are controlled to a brightness corresponding to the image data. Therefore, a display image corresponding to the image data can be observed from the front forward direction (the direction of the normal line of the substrates 3 and 4) of the liquid crystal display device 1, and from an oblique direction (a direction inclined from the normal line of the substrates 3 and 4), which means that a wide view angle display is obtained.

On the other hand, when the first opposing voltage $V_{com1}$ is applied to the first opposing electrode 17 and the second opposing voltage $V_{com2}$ is applied to the second opposing electrode 18, the vertical electric field E1 having an intensity corresponding to the data voltage $V_d$ is generated between the first opposing electrode 17 and the pixel electrodes 5 (pixels), and the oblique electric field E2 having a strong intensity corresponding to the difference between the value Vs of the data voltage $V_d$ and the value $V_{C2}$ of the second opposing voltage $V_{com2}$ is generated between the second opposing electrode 18 and the pixel electrodes 5. Accordingly, the pixels have the liquid crystal molecules in their regions behave in accordance with the electric field E1 to be controlled to a brightness corresponding to the image data, and the regions adjoining both sides of each pixel in the row direction have the liquid crystal molecules behave in accordance with the strong oblique electric field E2 to be substantially fixed to a predetermined oblique alignment state to substantially block the transmission of an obliquely entering light. Accordingly, a display image made by a light transmitted through the pixels is observed from the front forward direction of the liquid crystal display device 1, and a black image resulting from the light block by the regions adjoining both side of each pixel in the row direction is observed from an oblique direction, thereby producing narrow view angle display.

It is preferred that the second opposing voltage $V_{com2}$ be set to a voltage value which can generate the oblique electric field E2 having an intensity equal to or higher than a saturation electric field by which most of the liquid crystal molecules in the regions in which the oblique electric field is generated are aligned so as to make the longer axis of the molecules parallel with the direction of the applied electric field. By setting the second opposing voltage $V_{com2}$ to such a voltage value, it is possible to further blacken the display seen from the direction of the oblique electric field E when the second opposing voltage $V_{com2}$ is applied to the second opposing electrode 18.

Further, the liquid crystal display device 1 has the first opposing electrode 17 oppose to the plurality of pixel electrodes 5 and the second opposing electrode 18 oppose to the regions between adjoining pixel electrodes 5. Therefore, in case of wide view angle display, such pixels are formed as having an area whose width running in the direction perpendicular to the pixel electrode columns is equal to the distance between the center lines of two regions each between the pixel electrode columns and adjoining each other via one pixel electrode column. Accordingly, a sufficiently high aperture ratio can be achieved.

Further, the liquid crystal display device 1 has the first opposing electrode 17 formed into a pectinate shape comprising the plurality of stripe-shaped electrode portions 17b opposing to the plurality of pixel electrode columns respectively and the wiring portion 17a which binds one end of the respective electrode portions 17b at the outside of one end of the pixel electrode columns, and has the second opposing electrode 18 formed into a pectinate shape comprising the plurality of stripe-shaped electrode portions 18b opposing to the regions between the plurality of pixel electrode columns respectively and the wiring portion 18a which binds one end of the respective electrode portions 18b at the outside of the other end of the pixel electrode columns. Therefore, it is possible to apply the first opposing voltage $V_{com1}$ simultaneously to the entire first opposing electrode 17 opposing to the plurality of pixel electrode columns respectively, and selectively apply the first opposing voltage $V_{com1}$ or the second opposing voltage $V_{com2}$ simultaneously to the entire second opposing electrode 18 opposing to the regions between the plurality of pixel electrode columns.

Further, the liquid crystal display device 1 comprises the stripe-shaped color filters 19R, 19G, and 19B of three colors of red, green, and blue, which each have a width defined by one side edge of each filter that opposes to the center line of one of two regions between the pixel electrode columns which adjoin each other via one pixel electrode column, and by the other side edge of each filter that opposes to the center line of the other of the two regions between the pixel electrode columns. Therefore, it is possible to obtain the display by the respective pixels in case of wide view angle display and also the display by the respective pixels in case of narrow view angle display, as display pigmented in the colors of the color filters 19R, 19G, and 19B corresponding to the respective pixels over the entire region of the respective pixels, and thereby to obtain a color image having an excellent color quality both in case of wide view angle display and in case of narrow view angle display.

The liquid crystal display apparatus comprises the liquid crystal display device 1, and the display driver 23 which applies the data voltage $V_d$ corresponding to image data to the respective plurality of pixel electrodes 5 of the liquid crystal display device 1, applies to the first opposing electrode 17 of the first and second opposing electrodes 17 and 18 of the liquid crystal display device 1, the first opposing voltage $V_{com1}$ having a predetermined value for generating, between the first opposing electrode 17 and the pixel electrodes 5, the vertical electric field E1 corresponding to the data voltage $V_d$, and applies to the second opposing electrode 18, selectively the first opposing voltage $V_{com1}$ and the second opposing voltage $V_{com2}$ for generating, between the second opposing electrode 18 and the pixel electrodes 5, the oblique electric field E2 which aligns the liquid crystal molecules of the liquid crystal layer 2 in an alignment state which makes the display as seen from the direction of the oblique electric field E2 seem substantially black. Accordingly, it is possible to make the liquid crystal display device 1 perform wide view angle display and narrow view angle display, thereby obtain a changeable view angle type liquid crystal display apparatus by using one liquid crystal device having a simple structure.

Further, the liquid crystal display apparatus makes the display driver 23 set the second opposing voltage $V_{com2}$, which is to be applied to the second opposing electrode 18 of the liquid crystal display device 1, to such a voltage whose polarity with respect to the data voltage $V_d$ is the same as that of the first opposing voltage $V_{com1}$ and whose voltage value $V_{C2}$ has an absolute value which is sufficiently larger than that of the value $V_{C1}$ of the first opposing voltage $V_{com1}$. Therefore, the liquid crystal display apparatus can apply, between the pixel electrodes 5 and the second opposing electrode 18, the oblique electric field E2 which aligns the liquid crystal molecules in an alignment state which make the display as seen from the direction of the oblique electric field E2 seem substantially black, and can therefore make the liquid crystal display device 1 perform narrow view angle display which does not allow the display image to be observed from the direction of the oblique electric field E2.

The liquid crystal display device 1 according to the above-described first embodiment is provided, on the inner surface of the opposing substrate 4, with the color filters 19R, 19G, and 19B of three colors of red, green, and blue which correspond to the plurality of pixel electrode columns respectively, and which each have a width defined by one side edge of each filter that opposes to the center line of one of two regions between the pixel electrode columns which adjoin each other via one pixel electrode column, and by the other side edge of each filter that opposes to the center line of the other of the two regions between the pixel electrode columns. However, the color filters 19R, 19G, and 19B may be formed into other shapes.

Figure 7:
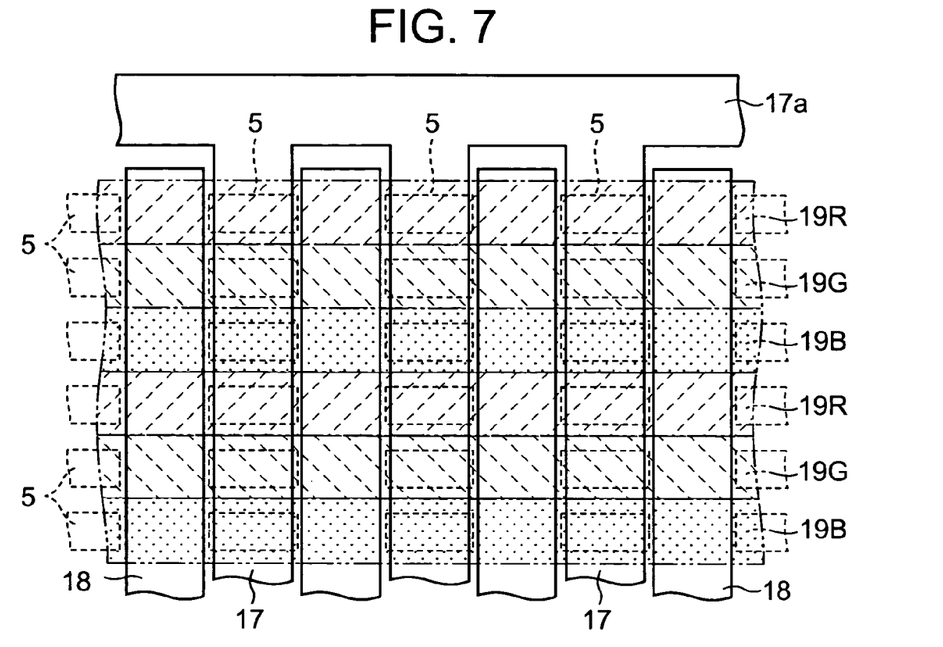
FIG. 7 is a plan view showing a relationship among a plurality of pixel electrodes, first and second opposing electrodes, and color filters of a liquid crystal display device according to a second embodiment of the present invention.

FIG. 7 shows the relationship among the plurality of pixel electrodes 5, the first and second opposing electrodes 17 and 18 and the color filters 19R, 19G, and 19B, according to a second embodiment of the present invention.

According to the second embodiment, stripe-shaped color filters 19R, 19G, and 19B of three colors of red, green, and blue are formed on the inner surface of one of the pair of substrates 3 and 4, for example, the opposing substrate 4, such that the filters respectively correspond to a plurality of pixel electrode rows constituted by pixel electrode groups arranged in a direction perpendicular to the pixel electrode columns and have a length corresponding to the total length of the respective pixel electrode rows. According to this embodiment too, it is possible to display a color image having an excellent color quality both in case of wide view angle display and in case of narrow view angle display.

Figure 8:
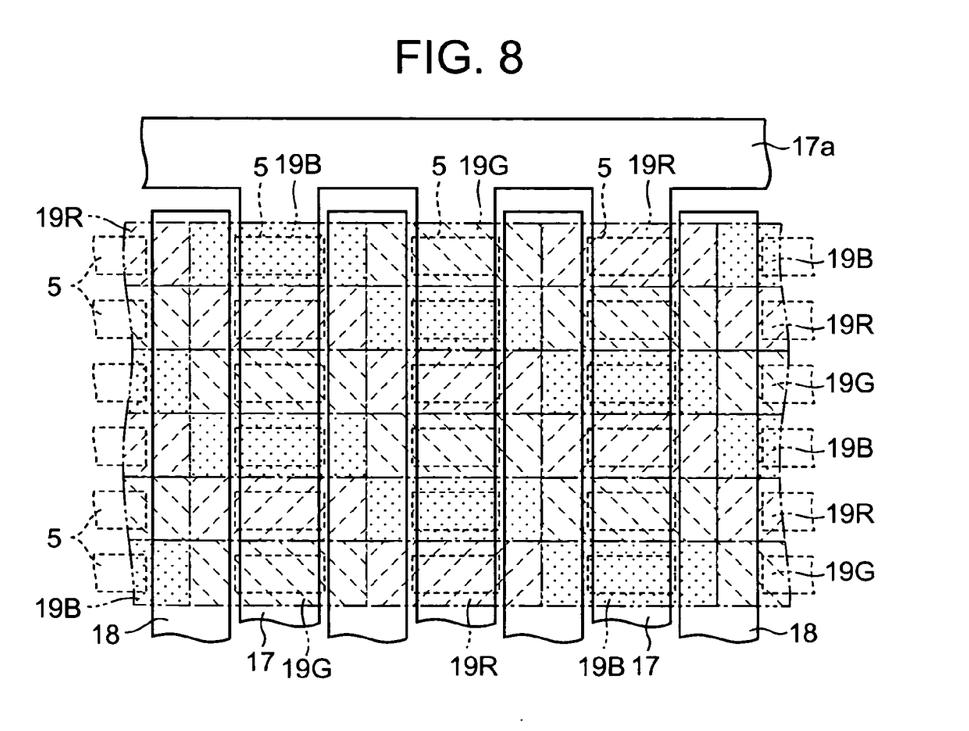
FIG. 8 is a plan view showing a relationship among a plurality of pixel electrodes, first and second opposing electrodes, and color filters of a liquid crystal display device according to a third embodiment of the present invention.

FIG. 8 shows the relationship among the plurality of pixel electrodes 5, the first and second opposing electrodes 17 and 18, and the color filters 19R, 19G, and 19B, according to a third embodiment of the present invention.

According to the third embodiment, dot-shaped color filters 19R, 19G, and 19B of three colors of red, green, and blue which each have a width defined by one side edge of each filter that opposes to the center line of one of two regions between the pixel electrode columns which adjoin each other via one pixel electrode column, and by the other side edge of each filter that opposes to the center line of the other of the two regions between the pixel electrode columns, are formed on the inner surface of one of the pair of substrates 3 and 4, for example, the opposing substrate 4, such that the filters of the three kinds are arranged alternately in a mosaic pattern both in the direction of the pixel electrode columns and in the direction perpendicular to that direction, in order for the dot-shaped filters to correspond respectively to the pixel electrodes 5 included in each of the plurality of pixel electrode columns. According to this embodiment too, it is possible to display a color image having an excellent color quality both in case of wide view angle display and in case of narrow view angle display.

Further, the liquid crystal display device 1 according to the above-described embodiments performs display of normally white mode. However, the present invention can be applied to a liquid crystal display device which performs display of normally black mode. Also in this case, by applying the second opposing voltage $V_{com2}$ having the same polarity as that of the first opposing voltage $V_{com1}$ which is reverse to the polarity of the data voltage $V_d$ and having a voltage value $V_{C2}$ sufficiently larger than the voltage value $V_{C1}$ of the first opposing voltage $V_{com1}$ to the second opposing electrode 18, it is possible to align the liquid crystal molecules in the regions adjoining the respective pixels in an alignment state which makes the display as seen from the direction of the oblique electric field E2 seem substantially white, and to perform narrow view angle display by making the full screen substantially white when seen from the direction of the oblique electric field E2.

Further, the liquid crystal display device 1 according to the above-described embodiments sets the second opposing voltage $V_{com2}$ to have a polarity reverse to that of the data voltage $V_d$ applied to the pixel electrodes 5 and have a voltage value $V_{C2}$ whose absolute value is sufficiently larger than the absolute value of the voltage value $V_{C1}$ of the first opposing voltage $V_{com1}$, by means of the display driver 23. However, the voltage value $V_{C2}$ of the second opposing voltage $V_{com2}$ may be the same as the voltage value Vs of the data voltage $V_d$. In this case, a liquid crystal display device of a normally white mode can perform narrow view angle display by which the full screen becomes substantially white when seen from the direction of the oblique electric field E2, and a liquid crystal display device of a normally black mode can perform narrow view angle display by which narrow view angle display by which the full screen becomes substantially black when seen from the direction of the oblique electric field E2.

The liquid crystal display apparatus according to the above-described embodiments uses, as the liquid crystal display device 1, a color image display device comprising the color filters 19R, 19G, and 19B of three colors of red, green, and blue, which correspond to the plurality of pixels respectively. However, the present invention can be applied to a field sequential liquid crystal display apparatus that uses a liquid crystal display device comprising no color filters.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-247726 filed on Aug. 29, 2005 and including specification, claims, drawings and summary. The disclosure of the above Japanese Patent Application is incorporated herein by reference in its entirety.

What is claimed is:

1. A liquid crystal display device, comprising:
  a pair of substrates facing each other via a liquid crystal layer;
  a plurality of pixel electrodes arranged in a matrix on an inner surface of one substrate, of facing inner surfaces of the pair of substrates;
  a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected;
  a first opposing electrode provided on the inner surface of the other substrate, for generating, between itself and the plurality of pixel electrodes respectively, a vertical electric field in a direction substantially parallel with a direction of a normal line of the substrates; and
  a second opposing electrode provided on the inner surface of the other substrate, for generating, between itself and the plurality of pixel electrodes respectively, an oblique electric field in a direction inclined obliquely from the direction of the normal line of the substrates.

2. The liquid crystal display device according to claim 1, wherein: the first opposing electrode is arranged so as to oppose to the plurality of pixel electrodes respectively; and
  the second opposing electrode is arranged so as to oppose to regions between adjoining pixel electrodes respectively.

3. The liquid crystal display device according to claim 1, wherein: the first opposing electrode is formed so as to oppose to a plurality of pixel electrode columns respectively, which each include pixel electrodes arranged in a column direction, of the plurality of pixel electrodes arranged in a matrix of a row direction and the column direction; and
  the second opposing electrode is formed so as to oppose to regions between the plurality of pixel electrode columns respectively.

4. The liquid crystal display device according to claim 3, wherein: the first opposing electrode is formed into a pectinate shape comprising a plurality of stripe-shaped electrode portions opposing to the plurality of pixel electrode columns respectively over an entire length of the columns, and a wiring portion which binds one end of the respective electrode portions at an outside of one end of the pixel electrode columns;
  the second opposing electrode is formed into a pectinate shape comprising a plurality of stripe-shaped electrode portions opposing to the regions between the plurality of pixel electrode columns respectively over an entire length of the regions, and a wiring portion which binds one end of the respective electrode portions at an outside of the other end of the pixel electrode columns.

5. The liquid crystal display device according to claim 3, wherein: the first opposing electrode is formed to have a width smaller than a width of the pixel electrodes opposing thereto respectively; and
  the second opposing electrode is formed to have a width substantially same as an interval between the plurality of pixel electrode columns.

6. The liquid crystal display device according to claim 1, further comprising
  stripe-shaped color filters having three colors of red, green, and blue, which are formed on the inner surface of the other substrate of the pair of substrates, such that the color filters respectively correspond to a plurality of pixel electrode columns each including pixel electrodes arranged in a column direction, of the plurality of pixel electrodes arranged in a matrix of a row direction and the column direction, and such that the color filters have a width defined by one side edge of each filter that opposes to a center line of one of two regions between the pixel electrode columns which adjoin each other via one pixel electrode column, and by the other side edge of each filter that opposes to a center line of the other of the two regions between the pixel electrode columns.

7. The liquid crystal display device according to claim 1, further comprising
  stripe-shaped color filters having three colors of red, green, and blue, which are formed on the inner surface of the other substrate of the pair of substrates, such that the color filters respectively correspond to a plurality of pixel electrode rows each including pixel electrodes arranged in a row direction, of the plurality of pixel electrodes arranged in a matrix of the row direction and a column direction, and such that the color filters have a length extending over an entire length of the pixel electrode rows.

8. The liquid crystal display deice according to claim 1, further comprising
  dot-shaped color filters having three colors of red, green, and blue, which are formed on the inner surface of the other substrate of the pair of substrates, such that the color filters respectively correspond to the pixel electrodes included in a plurality of pixel electrode columns each including pixel electrodes arranged in a column direction, of the plurality of pixel electrodes arranged in a matrix of a row direction and the column direction, and such that the color filters have a width defined by one side edge of each filter that opposes to a center line of one of two regions between the pixel electrode columns which adjoin each other via one pixel electrode column, and by the other side edge of each filter that opposes to a center line of the other of the two regions between the pixel electrode columns.

9. The liquid crystal display device according to claim 1, further comprising
  a pair of polarizing plates, which are disposed at external sides of the pair of substrates respectively, and whose transmission axes are arranged so as to constitute a liquid crystal display device of a normally white mode which allows light transmission when no electric field is applied between the plurality of pixel electrodes and the first opposing electrode.

10. The liquid crystal display device according to claim 1, further comprising
a pair of polarizing plates, which are disposed at external sides of the pair of substrate respectively, and whose transmission axes are arranged so as to constitute a liquid crystal display device of a normally black mode which substantially blocks light when no electric field is applied between the plurality of pixel electrodes and the first opposing electrode.

11. A liquid crystal display apparatus, comprising:
a liquid crystal display device comprising
a pair of substrates facing each other via a liquid crystal layer,
a plurality of pixel electrodes arranged in a matrix on an inner surface of one substrate, of facing inner surfaces of the pair of substrates,
a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected,
a first opposing electrode provided on the inner surface of the other substrate, for generating, between itself and the plurality of pixel electrodes respectively, a vertical electric field in a direction substantially parallel with a direction of a normal line of the substrates, and
a second opposing electrode provided on the inner surface of the other substrate, for generating, between itself and the plurality of pixel electrodes respectively, an oblique electric field in a direction inclined obliquely from the direction of the normal line of the substrate; and
a display driver which applies a vertical electric field corresponding to the image data to the liquid crystal layer in pixel regions defined by regions in which the plurality of pixel electrodes and the first opposing electrode of the liquid crystal display device oppose to each other, and applies an oblique electric field between the plurality of pixel electrodes and the second opposing electrode, for aligning liquid crystal molecules of the liquid crystal layer in regions adjoining the pixel regions at a predetermined tilt.

12. The liquid crystal display apparatus according to claim 11,
wherein: the first opposing electrode is formed such that the first opposing electrode opposes to a plurality of pixel electrode groups respectively, each of which includes pixel electrodes arranged in one of row and column directions, of the plurality of pixel electrodes arranged in a matrix of the row and column directions, and such that the first opposing electrode has a width smaller than a width of the pixel electrodes opposing thereto respectively; and
the second opposing electrode is formed so as to oppose to regions between the plurality of pixel electrode groups arranged in the one direction respectively.

13. The liquid crystal display apparatus according to claim 11,
wherein the display driver applies a data voltage corresponding to image data to the plurality of pixel electrodes respectively, applies a first opposing voltage having a predetermined value for generating, between the first opposing electrode and the pixel electrodes, an electric field corresponding to the data voltage to the first opposing electrode, and selectively applies a second opposing voltage having a polarity same as that of the first opposing voltage and an absolute value larger than that of the first opposing voltage to the second opposing electrode.

14. The liquid crystal display apparatus according to claim 11,
wherein the display driver applies a data voltage corresponding to image data to the plurality of pixel electrodes respectively, applies a first opposing voltage having a predetermined value for generating, between the first opposing electrode and the pixel electrodes, an electric field corresponding to the data voltage to the first opposing electrode, and selectively applies, to the second opposing electrode, one of the first opposing voltage and a second opposing voltage which has a polarity same as that of the first opposing voltage and an absolute value larger than that of the first opposing voltage and which is for substantially blocking light transmission through the regions adjoining the pixel regions.

15. A liquid crystal display apparatus, comprising:
a liquid crystal display device comprising
a pair of substrates facing each other via a liquid crystal layer,
a plurality of pixel electrodes arranged in a matrix on an inner surface of one substrate, of facing inner surfaces of the pair of substrates,
a plurality of thin film transistors which are arranged on the inner surface of the one substrate correspondingly to the plurality of pixel electrodes respectively, and to each of which a corresponding one of the plurality of pixel electrode, a gate line to which a gate signal is supplied, and a data line to which a data signal corresponding to image data is supplied are connected,
a first opposing electrode provided on the inner surface of the other substrate, for generating, between itself and the plurality of pixel electrodes respectively, a vertical electric field in a direction substantially parallel with a direction of a normal line of the substrates, and
a second opposing electrode provided on the inner surface of the other substrate, for generating, between itself and the plurality of pixel electrodes respectively, an oblique electric field in a direction inclined obliquely from the direction of the normal line of the substrate; and
a display driver which applies a data voltage for generating an electric field corresponding to the data signal between the plurality of pixel electrodes and the first opposing electrode, and selectively applies, between the pixel electrodes and the second opposing electrode, a view angle control voltage for generating an electric field for aligning liquid crystal molecules of the liquid crystal layer in an alignment state which makes a display as seen from an oblique direction seem substantially black or white.

16. The liquid crystal display apparatus according to claim 15,
wherein the display driver applies a data voltage corresponding to image data to the plurality of pixel electrodes respectively, applies a first opposing voltage having a predetermined value for generating, between the first opposing electrode and the pixel electrodes, an electric field corresponding to the data voltage to the first opposing electrode, and applies a second opposing voltage whose polarity with respect to the data voltage is same as that of the first opposing voltage and whose absolute value is sufficiently larger than that of the first opposing voltage to the second opposing electrode.

17. The liquid crystal display apparatus according to claim 15,
wherein the display driver applies a data voltage corresponding to image data to the plurality of pixel electrodes respectively, applies a first opposing voltage having a predetermined value for generating, between the first opposing electrode and the pixel electrodes, an electric field corresponding to the data voltage to the first opposing electrode, and applies a second opposing voltage which is the same voltage as the data voltage to the second opposing electrode.

18. The liquid crystal display apparatus according to claim 15,
wherein the display driver applies a data voltage corresponding to image data to the plurality of pixel electrodes respectively, applies a first opposing voltage having a predetermined value for generating, between the first opposing electrode and the pixel electrodes, an electric field corresponding to the data voltage to the first opposing electrode, and selectively applies the first opposing voltage and a second opposing voltage having a polarity same as that of the first opposing voltage and an absolute value larger than that of the first opposing voltage to the second opposing electrode.

19. The liquid crystal display apparatus according to claim 15,
wherein: the liquid crystal display apparatus can select voltages to apply, in response to designation to wide view angle display or designation to narrow view angle display;
the display driver applies the data voltage between the plurality of pixel electrodes, and the first opposing electrode and the second opposing electrode in response to designation to the wide view angle display; and
the display driver applies a data voltage corresponding to image data between the plurality of pixel electrodes and the first opposing electrode, and applies a view angle control voltage between the plurality of pixel electrodes and the second opposing electrode, in response to display of the narrow view angle display.

20. The liquid crystal display apparatus according to claim 15,
wherein the view angle control voltage is a voltage which has a polarity same as that of the data voltage and an absolute value sufficiently larger than that of the data voltage.

* * * * *